(12) United States Patent
Jamkhedkar et al.

(10) Patent No.: US 9,218,601 B2
(45) Date of Patent: Dec. 22, 2015

(54) SECURE IN-LINE PAYMENTS FOR RICH INTERNET APPLICATIONS

(75) Inventors: Prashant Jamkhedkar, Sunnyvale, CA (US); Upendra Mardikar, San Jose, CA (US); Mark Wenger, San Francisco, CA (US); Mehul Asher, Sunnyvale, CA (US); Victor Chau, San Mateo, CA (US)

(73) Assignee: PAYPAL, INC., San Jose, CA (US)

( * ) Notice: Subject to any disclaimer, the term of this patent is extended or adjusted under 35 U.S.C. 154(b) by 0 days.

(21) Appl. No.: 13/293,004

(22) Filed: Nov. 9, 2011

(65) Prior Publication Data

US 2012/0116925 A1    May 10, 2012

Related U.S. Application Data

(60) Provisional application No. 61/412,307, filed on Nov. 10, 2010, provisional application No. 61/412,313, filed on Nov. 10, 2010.

(51) Int. Cl.
| | |
|---|---|
| *G06Q 30/00* | (2012.01) |
| *G06Q 30/06* | (2012.01) |
| *G06Q 20/20* | (2012.01) |
| *G06Q 20/32* | (2012.01) |
| *G06Q 20/34* | (2012.01) |
| *G06Q 20/36* | (2012.01) |
| *G06Q 20/38* | (2012.01) |
| *G06Q 20/40* | (2012.01) |

(52) U.S. Cl.
CPC .............. *G06Q 30/00* (2013.01); *G06Q 20/206* (2013.01); *G06Q 20/3223* (2013.01); *G06Q 20/356* (2013.01); *G06Q 20/3674* (2013.01); *G06Q 20/382* (2013.01); *G06Q 20/40* (2013.01); *G06Q 30/0641* (2013.01)

(58) Field of Classification Search
USPC .............. 705/27, 16, 21, 59, 71; 380/44, 262, 380/278, 279
See application file for complete search history.

(56) References Cited

U.S. PATENT DOCUMENTS

| | | | |
|---|---|---|---|
| 7,650,390 B2 | 1/2010 | Arner et al. | |
| 2003/0177394 A1* | 9/2003 | Dozortsev | ...................... 713/201 |
| 2003/0191942 A1* | 10/2003 | Sinha et al. | .................... 713/181 |
| 2005/0193205 A1* | 9/2005 | Jacobs et al. | .................. 713/176 |
| 2006/0120560 A1 | 6/2006 | Davis et al. | |
| 2006/0259776 A1 | 11/2006 | Johnson et al. | |

(Continued)

OTHER PUBLICATIONS

PCT International Search Report & Written Opinion for PCT/US2011/060201, dated Mar. 16, 2012, pp. 1-17.

*Primary Examiner* — Dante Ravetti
(74) *Attorney, Agent, or Firm* — Haynes and Boone, LLP

(57) ABSTRACT

Methods and systems are provided for making secure financial transactions, such as purchase payments, using rich Internet applications (RIA) running an RIA runtime (also referred to as a platform or framework) on the user's smart phone or other mobile device. Embodiments differ from the usual way of re-directing a user from a third-party application and authenticating the user by providing secure in-line payments from a rich Internet application running on an RIA runtime. A system includes: a mobile device executing a rich Internet application running on an RIA runtime; a payment library communicating with the RIA runtime and a service provider, for which the payment library communicates with the service provider to authenticate the rich Internet application; and in response to authentication by the service provider, facilitates secure financial transactions via the rich Internet application.

18 Claims, 4 Drawing Sheets

(56) References Cited

U.S. PATENT DOCUMENTS

| | | |
|---|---|---|
| 2007/0180125 A1 | 8/2007 | Knowles et al. |
| 2007/0282858 A1 | 12/2007 | Arner et al. |
| 2008/0015985 A1 | 1/2008 | Abhari et al. |
| 2008/0288405 A1* | 11/2008 | John ............................... 705/44 |
| 2009/0287600 A1* | 11/2009 | Amorosa et al. ................ 705/39 |
| 2009/0298480 A1* | 12/2009 | Khambete et al. ......... 455/414.1 |
| 2010/0042824 A1* | 2/2010 | Lee et al. ......................... 713/2 |
| 2011/0093568 A1* | 4/2011 | Thomas ....................... 709/219 |

* cited by examiner

SECURE IN-LINE PAYMENTS FOR RICH INTERNET APPLICATIONS

CROSS REFERENCE TO RELATED APPLICATIONS

This application claims priority to U.S. Provisional Application No. 61/412,307, filed Nov. 10, 2010, and U.S. Provisional Application No. 61/412,313, filed Nov. 10, 2010, both of which are incorporated by reference.

BACKGROUND

1. Technical Field

The present disclosure generally relates to electronic commerce conducted over a network and, more particularly, to providing security for the use of rich internet applications in conducting financial transactions such as purchases from a mobile device or other consumer electronic device.

2. Related Art

The term "rich Internet application" (RIA) generally refers to a Web application (e.g. one that is accessed over a network such as the Internet or an intranet) that has characteristics of desktop application software, and which is typically delivered either by way of a site-specific browser (e.g., a browser dedicated to accessing pages from a single site on a computer network such as the Internet, and typically simplified by excluding menus, toolbars, and other interface features associated with functions that are extraneous to the workings of the single site) or a browser plug-in, for example. Rich Internet applications generally run on top of an application platform (also referred to as an "RIA runtime" or framework) such as Flash®, Silverlight®, or JavaFX®. Rich Internet applications generally use a "rich client" deployment model (deployment of a compiled client application through a browser) rather than a "thin client" server model (where the user's view is largely controlled from the server).

Electronic commerce generally refers to the buying and selling of products or services over electronic networks such as the Internet and other computer networks using electronic devices such as mobile phones with mobile web browsers, smart phones, and electronic note pads. There are several service providers that facilitate electronic commerce by providing services to make payments and perform other transactions with security. One service provider, for example, provides a service that can be invoked from a participating merchant's website by simply clicking on the service provider's checkout button at the merchant website, which redirects the customer to a login page of the service provider where the customer can securely log in to his or her service provider account and select his or her preferred payment method. Then, for example, payment is made to the merchant by the service provider, and the customer is redirected back to the merchant website where the customer may confirm his or her purchase.

SUMMARY

According to one or more embodiments of the present invention, methods and systems are provided for making secure financial transactions, such as making purchase payments, through a service provider using rich Internet applications (RIA) running on top of an RIA runtime (also referred to as a platform or framework) on the user's device, such as a smart phone or other mobile device. Embodiments differ from the usual way of re-directing a user from a third-party application and authenticating the user in that embodiments provide secure in-line payments from a rich Internet application running on an RIA runtime.

In one or more embodiments, a system includes: a mobile device executing a rich Internet application (RIA) that runs on an RIA runtime; a payment library that communicates with the RIA runtime and a service provider, for which the payment library communicates with the service provider to authenticate the rich Internet application; and in response to an authentication by the service provider, the payment library displays a user authorization screen on the mobile device for collecting user authorization for a particular activity.

In another embodiment, a computer-implemented method includes: receiving a connection request at a server from a rich Internet application running on a client device; responding to the client device with a request for an oblivious hashing of the application; receiving a result of the oblivious hashing at the server; and in response to authenticating the rich Internet application, sending an out of band confirmation to a user of the client device.

In a further embodiment, a computer program product comprises a non-transitory computer readable medium having computer readable and executable code for instructing a processor to perform a method that includes: receiving a connection request at a server from a rich Internet application running on a client device; responding to the client device with a request for an oblivious hashing of the application; receiving a result of the oblivious hashing at the server; and in response to authenticating the rich Internet application, sending an out of band confirmation to a user of the client device.

DETAILED DESCRIPTION

Figure 1:
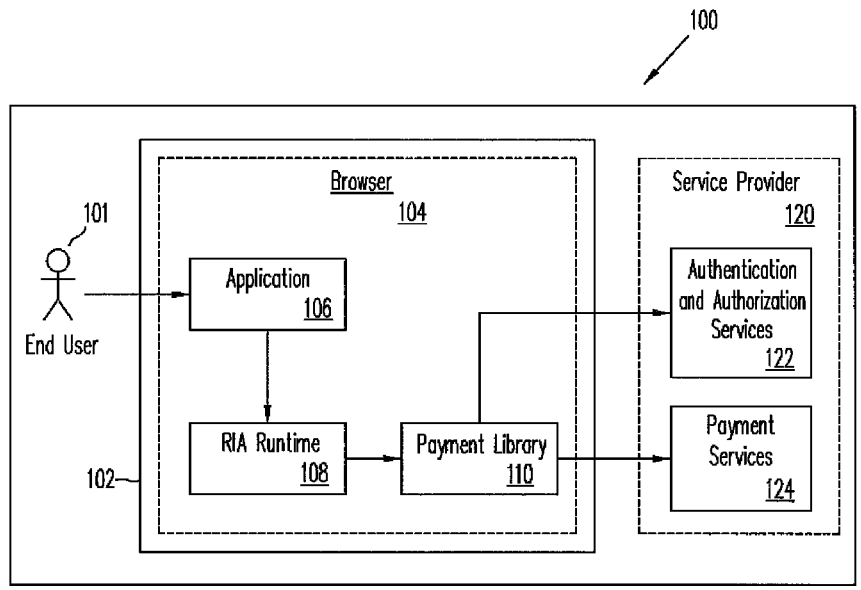
FIG. 1 is a system diagram illustrating a system for facilitating secure financial transactions using a rich Internet application, in accordance with one or more embodiments.

In accordance with embodiments of the present invention, methods and systems are provided for making secure financial transactions, such as making purchase payments, through a service provider using rich Internet applications. When a user interacts with a rich Internet application (RIA) running on top of an RIA runtime platform on the user's device, such as a smart phone or other mobile device, the service provider may have a library which is responsible for application authentication, user authentication, and user authorization with the service provider. This library may also contain service provider specific data collection information to aid fraud analysis. The library may present a user interface to the user to collect all the credential information related to the user. The service provider library may depend on the RIA runtime to verify the integrity of an application running within the runtime. It may also authenticate the runtime. The more information the runtime provides to the service provider library, the more the service provider can trust the application to execute advanced level capabilities. Thus, the service provider may provide secure in-line payments within the runtime and other applications. The system and method may be used to make in-line payment functionalities (e.g., simple payments, complex payments, and preapprovals) via in-line rich Internet applications in a secure manner.

Embodiments differ from the usual way of re-directing a user from a third-party application and authenticating the user, which do not provide secure in-line payments from an RIA runtime. Providing secure in-line payments from a rich interne app running on an RIA runtime according to one or more embodiments differs from service provider models that use a re-direct and an explicit user authentication model, where a user is re-directed to the service provider to enter the user's credentials. For example, the RIA runtime framework may include artifacts (e.g., the payment library) on the client device (e.g., the user mobile device) and service provider services (e.g., authentication and authorization) may be presented to the user as external services to accommodate step-up authentication (additional authentication procedures that may be used, for example, in unusual situations such as large purchase amounts). The usual methods using re-direct do not provide solutions to the problem of making in-line payments in a secure way within an RIA component. One or more embodiments may enable making payments in a secure way using in-line RIA components.

A service provider as described above, which may provide various financial services such as providing an intermediary between a merchant and consumer for making on-line payments over a network such as the Internet, may accept various risks (such as authentication and authorization risks) involved with the use of web browsers downloaded from trusted websites, standard browsers, and passwords entered into those browsers. Some of the risks may be addressed, for example, by a customer verifying communication is actually with the service provider using extended validation (EV) certificates, and other active efforts to fight botnets, spoofing, and malware, for example. If a customer downloads an application ("app") from an app store, the customer may wish to have some means to determine that the app is valid and that the customer's user credentials that they are providing through the app actually go to the service provider and no one else. A fundamental issue with apps is that there is no standard mechanism—such as an EV certificate—for validating the app so that the customer can tell that he or she is communicating with the service provider.

The following example provides a brief illustration of how one or more embodiments address that issue. The service provider may pre-register the customer so that the customer's mobile phone number is stored in the browser on the customer's mobile device. When the customer downloads an app from an app store and if the customer wants to check the validity (and only if, it may be recommended that a particular app need not be checked every time but only, for example, on a first use) the customer may click on a button provided in the browser for validity checking. The button invokes a service provider check of the app, using, for example, oblivious hashing, and if the app passes, the service provider may send a short message service (SMS) text message to the user that the app is valid. The oblivious hashing can be used in addition to validating code signatures, which, for example, can be embedded and obfuscated inside a code segment of the app using randomizing technologies such as standard ones known in the art.

The above validation procedure, which provides a message to the customer regarding whether the app the user is using has been found valid or not, may provide reassurance (e.g., by preventing fraud) to a customer in the making of on-line payments using RIA technology. For example, companies and researchers have been trying to provide solutions for the problem of "phishing" for some time. The phishing problem has multiple components and there are several research papers and books on the topic. In addition to the phishing problem, there are various attack scenarios that may arise when a customer uses an application and that application communicates with a server (e.g., service provider server). Some of the attack scenarios, involving the customer (e.g., user), app (e.g., RIA application), and server (e.g., service provider server) may be described as follows. The non-attack scenario in which a customer uses an application and that application communicates with a server would be denoted in the notation below as Customer→App→Server.

1) Spoof app and spoof server: Customer→Rogue App→Rogue Server.

2) Spoof app and legitimate server: Customer→Rogue App→Server

3) Spoof app, rogue server and legitimate server (known as "man-in-the-middle" (MITM)): Customer→Rogue App→Rogue Server→Server 4) Spoof app, rogue server, legitimate app, and legitimate server (also an MITM attack): Customer→Rogue App→Rogue Server→App→Server Some current controls for dealing with these types of attacks and problems that remain are as follows: A) placing a security image on the server: this will not prevent attack numbers 2, 3, and 4, and then eventually 1; and B) placing a security image on the client: this presents a number of on-boarding issues (e.g., how does the customer know which app is legitimate in the first place), is non-portable from one machine to another, and images can be copied. Some examples of guiding principles to solve the preceding issues are as follows: 1) validation of the RIA app should be highly visible to the user; 2) the validation can be optionally personalized to the user for increased effectiveness, but need not depend on personalization; and 3) the validation should effectively prove to the user that the user is interacting with a legitimate app and a legitimate server.

FIG. 1 illustrates a system 100 in accordance with one or more embodiments for facilitating secure financial transactions using a rich Internet application. As shown in FIG. 1, a user 101 may communicate via a mobile device 102, which may be running a browser 104, such as any one of a number of commercially available web browsers, that presents a user interface to user 101. The browser may be used to activate an application 106 (referred to as app 106) that runs on a rich internet application (RIA) runtime 108 (also referred to as a platform or framework). App 106 running on RIA runtime 108 may communicate with a service provider 120 via a payment library 110 resident on the client mobile device 102.

As described above, payment library 110 may include data collection information specific to service provider 120. The data collection information may be used, for example, to aid fraud analysis, for authentication of app 106, authentication of user 101, and authorization with service provider 120. The payment library 110 may, via RIA runtime 108 and RIA app 106, present a user interface to user 101 to collect credential information related to user 101. The payment library 110 may depend on the RIA runtime 108 to verify the integrity of an application (e.g., app 106) running within the RIA runtime 108. The payment library 110 also may authenticate the framework (e.g., RIA runtime 108). Payment library 110 may interact, as shown in FIG. 1, with an authentication and authorization services 122 of service provider 120 for processing credential information, verifying integrity of app 106 and authenticating RIA runtime 108. The more information the RIA runtime 108 provides to the payment library 110, the more the service provider 120 may become able to trust the app 106 to execute advanced level capabilities. For example, app 106 running on RIA runtime 108 may interact through payment library 110 with payment services 124 of service provider 120 to provide a number of financial services to user 101.

Figure 2:
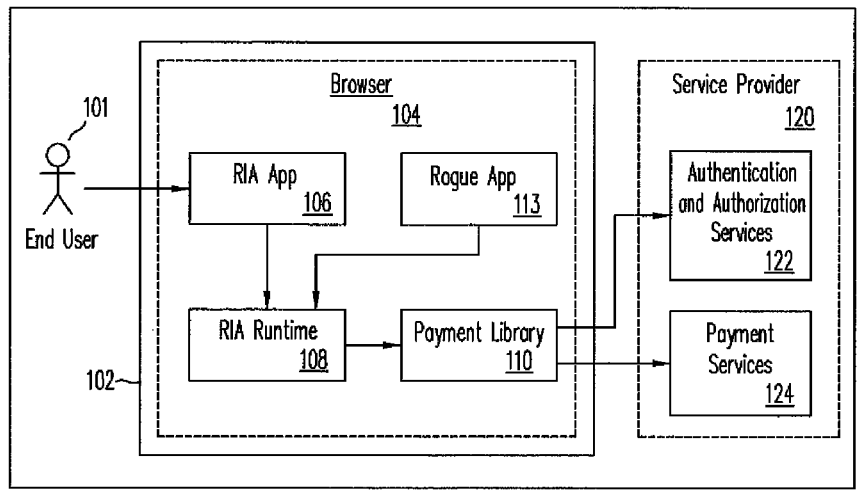
FIG. 2 is a system diagram illustrating a system for facilitating secure financial transactions using a rich Internet application, in which the system is being attacked, in accordance with one or more embodiments.

FIG. 2 illustrates system 100, as in FIG. 1, with the addition that a rogue app 113 has gained entry to browser 104. The rogue app 113 may try to run on top of RIA runtime 108 to attack system 100 according to one or more of the attack scenarios described above. One or more embodiments may use oblivious hashing with remote servers (e.g., servers located at service provider 120) to tamper proof payment library 110 as described in more detail below. One or more embodiments may augment the use of oblivious hashing with additional technologies such as code signatures, code obfuscation, prevention of code reflection, and code disassembly prevention.

Figure 3:
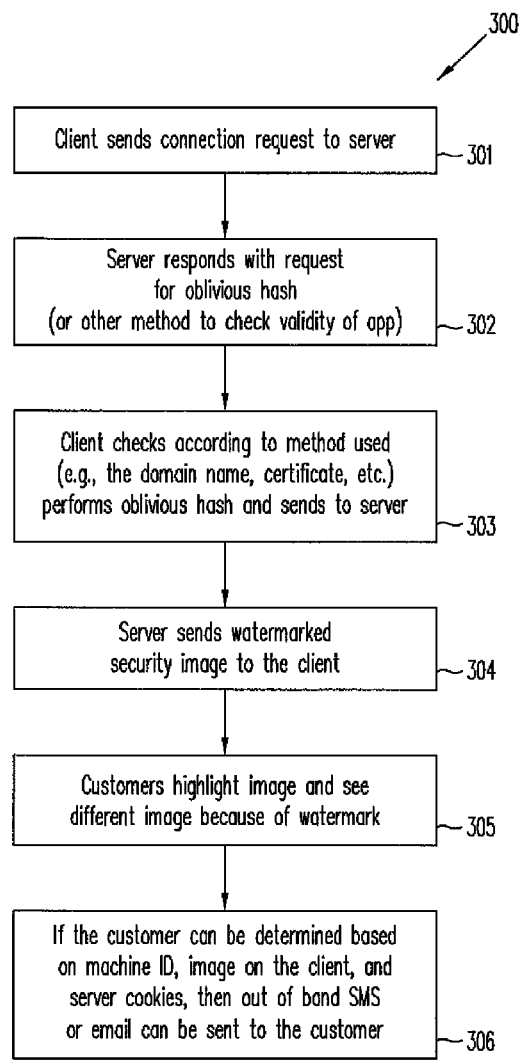
FIG. 3 is a flowchart illustrating a method for authenticating an app in a system for facilitating secure financial transactions using a rich Internet application, in accordance with one embodiment.

FIG. 3 illustrates an example of a method 300 for authenticating an app in a system for facilitating secure financial transactions using a rich Internet application, in accordance with one embodiment. At step 301, a client (e.g., mobile device 102, operated by user 101, running browser 104) may send a connection request to a server (e.g., authentication and authorization services 122 of service provider 120).

At step 302, the server (e.g., authentication and authorization services 122 of service provider 120) may respond with a request for oblivious hashing of the application (e.g., app 106). Oblivious hashing, in general, is a tool that can be used to verify the behavior of programs. For software running locally on a single machine, for example, oblivious hashing can prevent tampering by either a malicious hacker or malware (viruses, worms, and trojans). For client and server applications, oblivious hashing can prove a client's authenticity and proper functioning to a server, and vice versa. In addition to oblivious hashing, other methods for checking the validity of app 106, such as code signatures, code obfuscation, prevention of code reflection, and code disassembly prevention, could be used instead of or in conjunction with oblivious hashing.

At step 303, the client (e.g., RIA runtime 108 and payment library 110 on mobile device 102) may perform the oblivious hash and send the results to the server (e.g., authentication and authorization services 122 of service provider 120). In addition, at step 303, if supplementary technologies for checking app validity are used, the client may perform tasks required by those technologies such as checking the domain name of the server and checking certificates such as an EV certificate.

At step 304, the server (e.g., authentication and authorization services 122 of service provider 120) may send a watermarked image specific to the service provider 120 (e.g., containing a trademark logo of the service provider 120 or a personalized image chosen by user 101) to the client (e.g., mobile device 102). At step 305, the customer (e.g., user 101) may highlight the watermarked image and see a different image because of the watermark, for example, using existing public (oblivious) watermark technology or private watermark technology.

At step 306, if the customer (e.g., user identity) can be determined, based on, for example, machine identification (e.g., a machine identification (ID) such as IMEI (international mobile equipment identification) number), image on the client (e.g., the watermarked image), and server cookies (e.g., information in payment library 110), then an out of band message (e.g., a message not depending on or using client device 102 or browser 104 for delivery to the user 101) such as an SMS text message or email may be sent to the customer (e.g., user 101).

Method 300 may be used to thwart attack scenarios 1), 2), and 3), described above. It thus avoids the problems of the control A), placing a security image on the server, described above, by preventing attack scenarios 2) and 3). The use of an out of band message in method 300 may be used to prevent attack scenario 4). For example, the customer (e.g. user 100) may be on-boarded out of band (e.g., via a website of service provider 120). During the on-boarding, a registration process may identify an out of band channel for communication with the customer and determine, for example, a phone number to email ID mapping. Subsequently, e.g., during the use of method 300, when the service provider 120 wants the customer to check for attack scenario 4) in the case, for example, of a high-value transaction or suspicious (e.g., based on machine ID or fraud models) there may be a button (for example, in the app 106 or browser 104) that asks the customer to check on those transactions (either optionally or on suspicious transactions). When the customer clicks on the button an email address ID or phone number, for example, may be asked to be entered. The out of band (e.g., SMS text or email) message is sent out of band based on the mapping that the service provider determined during the on-boarding (e.g., reverse the mapping). So if the customer doesn't get the expected out of band message (e.g., SMS) in response to entering his or her email ID, then the customer may realize the customer is under an MITM attack scenario 4), because in the case of that attack scenario, the SMS goes to the rogue and not to the customer.

Figure 4:
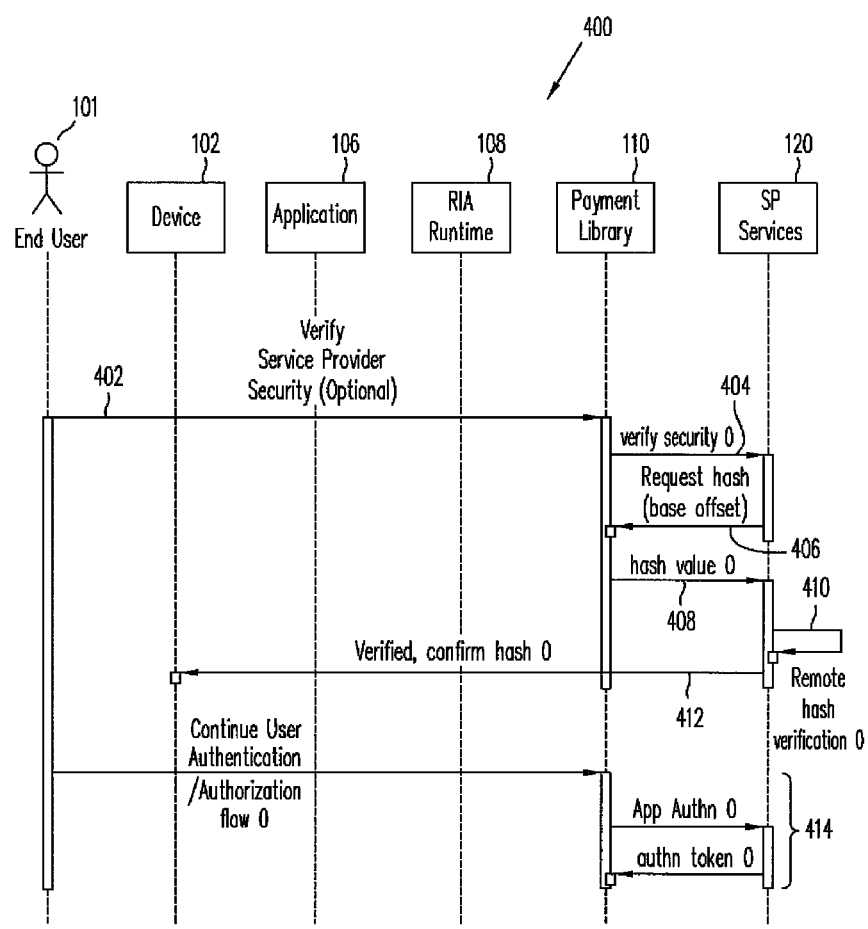
FIG. 4 is a sequence flow diagram illustrating operation of a system for facilitating secure financial transactions using a rich Internet application, in accordance with an embodiment.

FIG. 4 illustrates a method 400 for a simple payment in a system (e.g., system 100) for facilitating secure financial transactions using a rich Internet application, in accordance with an embodiment. Execution of method 400 may assume that a user (e.g., end user 401, shown in FIG. 4) has initiated a payment call to an application (e.g., app 106 of system 100).

At step 402, user 101 may optionally verify if the collection of the credentials (e.g. credentials communicated from a server of service provider 120) is from a certified location of service provider 120 and not from a spoofed location. User 101 may trigger a request to payment library 100 via a button (e.g. a button provided by app 106 or browser 104).

At step 404, payment library 110 may communicate to service provider 120 to verify the payment library 110. At step 406, service provider 120 may, according to content and version of payment library 110, for example, send a request to the payment library 110 to calculate a hash value of the dynamic stack (e.g., execution stack of RIA runtime 108 or payment library 110) based on a base and offset. At step 408, payment library 110 may calculate a hash value (e.g., using oblivious hashing) and send the result to service provider 120 (e.g., to an authentication and authorization services 122 server). At step 410, the service provider 120 (e.g., authentication and authorization services 122) may verify the hash result. At step 412, in response to a positive result, e.g., that app 106 is verified as being valid, service provider 120 may send an out of band confirmation (e.g., via an email, a registered email, or SMS text).

At step 414, method 400 may continue with additional steps for user authentication and authorization and for making a payment. Using method 400, the service provider 120 may provide secure in-line payments within a rich Internet application running on one of many commercially available RIA runtime platforms or frameworks, as noted above.

Figure 5:
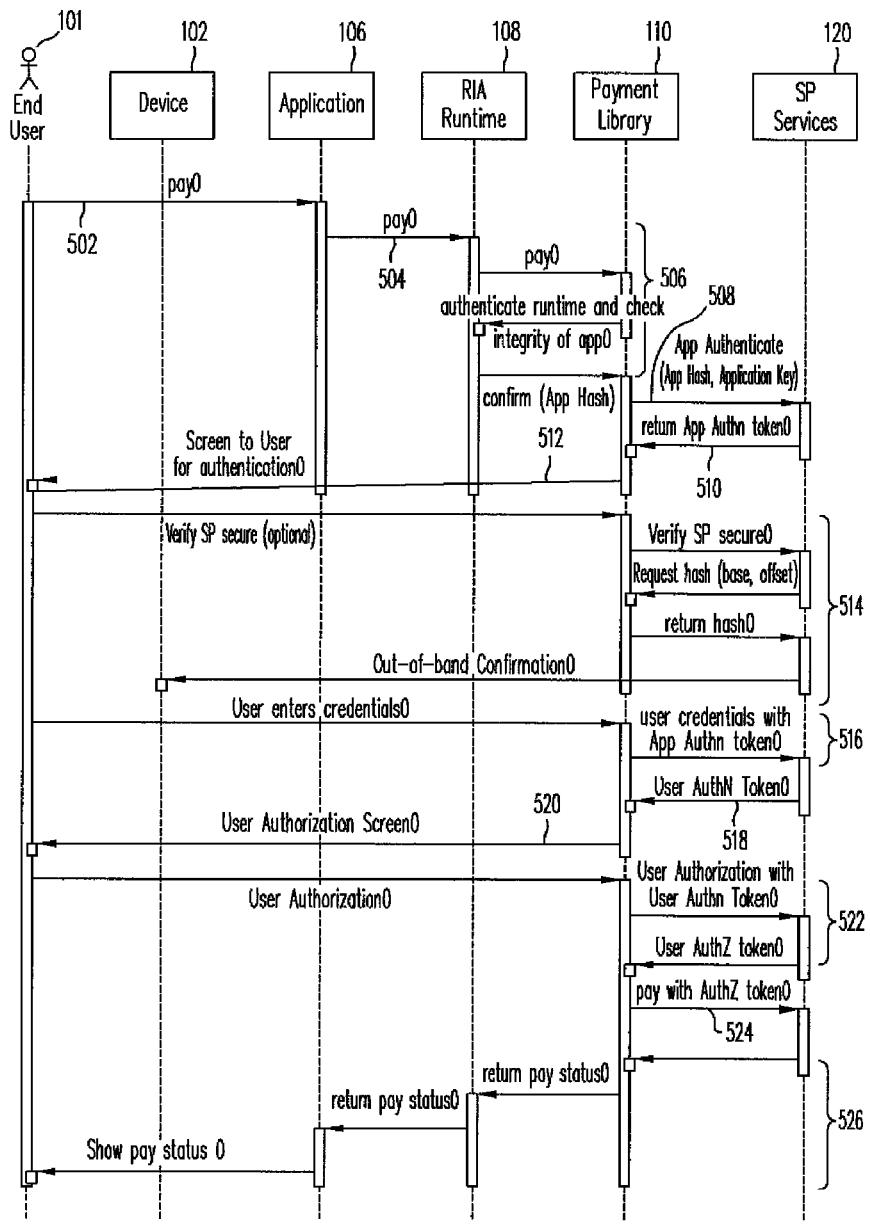
FIG. 5 is a sequence flow diagram illustrating operation of a system for facilitating secure financial transactions using a rich Internet application, in accordance with another embodiment.

FIG. 5 illustrates a method 500 for a simple payment in a system (e.g., system 100) for facilitating secure financial transactions using a rich Internet application, in accordance with an embodiment.

At step 502, a user 101 (e.g., customer) may, using a mobile device 102, click a button provided by a service provider 120 in an app 106 running on mobile device 102. At step 504, app 106 may send a pay request (e.g., "pay $10 to ABC Company") to the RIA runtime 108. At step 506, RIA runtime 108 may communicate with the payment library 110 to authenticate the RIA runtime 108 and also to verify the integrity of the app 106 (e.g., to verify that a legitimate app 106 is running on top of the RTA runtime 108). At step 508, the payment library 110 may communicate with service provider 120 to authenticate the app 106, using, for example, oblivious hashing. At step 510, the service provider 120 may respond with an app authorization token sent to payment library 110. At step 512, payment library 110 may display a user authentication screen to the user 101, on device 102, to collect the login credentials to authenticate the user 1001. With the authentication credentials, payment library 110 may also collect details of the environment (e.g., state of mobile device 102) for analysis.

At step 514, as an optional step, user 101 can verify if the collection of the credentials is from a location certified by the service provider 120 and not a spoofed location. For example, the user may employ method 400, described above, by clicking a button in app 106 provided by service provider 120.

At step 516, user 101 may enter credentials, and an authentication request may be sent (e.g., from payment library 110) to service provider 120 along with the app authorization token (see step 510). At step 518, service provider 120 may respond by sending a user authorization token to payment library 110. Payment library 110, at step 520, may then display a user authorization screen to the user 101, on device 102, to collect the user authorization for the particular activity (e.g. making a payment).

At step 522, the relevant request with the user authorization token may be sent to the service provider 120, which may respond back to the payment library 110 with a user authorization token specific to the particular activity. At step 524, the payment library 110 may make a request to service provider 120 (e.g., to payment services 124), to execute the pay call with the specific authorization token.

At step 526, the service provider 120 and payment library 110 may return the payment status to app 106, with display on the screen of mobile device 102 for user 101. Using method 500, the service provider 120 may provide secure in-line payments within a rich Internet application running on one of many commercially available RIA runtime platforms or frameworks, as noted above.

In implementation of the various embodiments, embodiments of the invention may comprise a personal computing device, such as a personal computer, laptop, PDA, cellular phone or other personal computing or communication devices. The payment provider system may comprise a network computing device, such as a server or a plurality of servers, computers, or processors, combined to define a computer system or network to provide the payment services provided by a payment provider system.

In this regard, a computer system may include a bus or other communication mechanism for communicating information, which interconnects subsystems and components, such as a processing component (e.g., processor, micro-controller, digital signal processor (DSP), etc.), a system memory component (e.g., RAM), a static storage component (e.g., ROM), a disk drive component (e.g., magnetic or optical), a network interface component (e.g., modem or Ethernet card), a display component (e.g., CRT or LCD), an input component (e.g., keyboard or keypad), and/or cursor control component (e.g., mouse or trackball). In one embodiment, a disk drive component may comprise a database having one or more disk drive components.

The computer system may perform specific operations by processor and executing one or more sequences of one or more instructions contained in a system memory component. Such instructions may be read into the system memory component from another computer readable medium, such as static storage component or disk drive component. In other embodiments, hard-wired circuitry may be used in place of or in combination with software instructions to implement the invention.

Logic may be encoded in a computer readable and executable medium, which may refer to any medium that participates in providing instructions to the processor for execution. Such a medium may take many forms, including but not limited to, non-volatile media, volatile media, and transmission media. In one embodiment, the computer readable medium is non-transitory. In various implementations, non-volatile media includes optical or magnetic disks, such as disk drive component, volatile media includes dynamic memory, such as system memory component, and transmission media includes coaxial cables, copper wire, and fiber optics, including wires that comprise bus. In one example, transmission media may take the form of acoustic or light waves, such as those generated during radio wave and infrared data communications.

Some common forms of computer readable and executable media include, for example, floppy disk, flexible disk, hard disk, magnetic tape, any other magnetic medium, CD-ROM, any other optical medium, punch cards, paper tape, any other physical medium with patterns of holes, RAM, ROM, E2PROM, FLASH-EPROM, any other memory chip or cartridge, carrier wave, or any other medium from which a computer is adapted.

In various embodiments, execution of instruction sequences for practicing the invention may be performed by a computer system. In various other embodiments, a plurality of computer systems coupled by a communication link (e.g., LAN, WLAN, PTSN, or various other wired or wireless networks) may perform instruction sequences to practice the invention in coordination with one another.

Modules described herein can be embodied in one or more computer readable media or be in communication with one or more processors to execute or process the steps described herein.

A computer system may transmit and receive messages, data, information and instructions, including one or more programs (i.e., application code) through a communication link and a communication interface. Received program code may be executed by a processor as received and/or stored in a disk drive component or some other non-volatile storage component for execution.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa—for example, a virtual Secure Element (vSE) implementation or a logical hardware implementation.

Software, in accordance with the present disclosure, such as program code and/or data, may be stored on one or more computer readable and executable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present invention to the precise forms or particular fields of use disclosed. It is contemplated that various alternate embodiments and/or modifications to the present invention, whether explicitly described or implied herein, are possible in light of the disclosure. Having thus described various example embodiments of the disclosure, persons of ordinary skill in the art will recognize that changes may be made in form and detail without departing from the scope of the invention. Thus, the invention is limited only by the claims.

What is claimed is:

1. A method comprising:
   initiating, by a service provider server, an installation of a payment library on a client device, wherein initiating the installation comprises initiating an execution of a rich Internet application (RIA) that runs on a RIA runtime of the payment library;
   receiving, by the service provider server, a connection request from the client device based on the execution of the RIA application;
   requesting, by the service provider server, the payment library on the client device to perform a runtime validity check of the RIA application;
   receiving, by the service provider server, a result of the runtime validity check from the payment library on the client device;
   determining, by the service provider server, from the result of the runtime validity check whether the RIA application is verified as valid;
   based on determining the RIA application is verified as valid:
      sending, by the service provider server, an app authorization token to the payment library on the client device;
      accepting, by the service provider server, user credentials and the app authorization token; and
      initiating, by the service provider server, an authentication of the user credentials without requiring redirection of the RIA application to a secure service provider website.

2. The method of claim 1, further comprising:
   sending a watermarked image to the client device; and
   determining a user identity based on the watermarked image.

3. The method of claim 1, wherein determining the RIA application is verified as valid further comprises determining at least one of oblivious hashing, code signatures, code obfuscation, prevention of code reflection, and code disassembly prevention.

4. The method of claim 1, further comprising:
   determining a customer based on at least one of machine identification of the client device;
   sending a watermarked image to the client device or server cookies placed on the client device; and
   sending an out of band message to the determined customer.

5. The method of claim 1, further comprising:
   identifying an out of band channel for communication with a user in an out-of-band on-boarding process for the user.

6. The method of claim 1, further comprising:
   determining a phone number-to-email identification (ID) mapping in an out-of-band on-boarding process for a user;
   asking the user to enter ID information corresponding to the mapping; and
   sending an out of band message to the user based on reversing the mapping.

7. The method of claim 1, further comprising:
   collecting a user authorization from a user for making a payment;
   providing a user authorization token specific to a particular activity to the user;
   receiving a request to execute a pay call with the specific authorization token; and
   returning a payment status to the RIA application with a display on the screen of the client device.

8. A non-transitory computer-readable medium comprising code that, when executed by a processor, causes the processor to perform steps comprising:
   initiating an installation of a payment library on a client device, wherein initiating the installation comprises initiating an execution of a rich Internet application (RIA) that runs on a RIA runtime of the payment library;
   receiving a connection request from the client device based on the execution of the RIA application;
   requesting the payment library on the client device to perform a runtime validity check of the RIA application;
   receiving a result of the runtime validity check from the payment library on the client device;
   determining from the result of the runtime validity check whether the RIA application is verified as valid;
   based on determining the RIA application is verified as valid:
      sending an app authorization token to the payment library on the client device;
      accepting user credentials and the app authorization token; and
      initiating an authentication of the user credentials without requiring redirection of the RIA application to a secure service provider website.

9. The non-transitory computer-readable medium of claim 8, wherein the processor performs further steps comprising:
   sending a watermarked image to the client device; and
   determining a user identity based on the watermarked image.

10. The non-transitory computer-readable medium of claim 8, wherein determining the RIA application is verified as valid further comprises determining at least one of oblivious hashing, code signatures, code obfuscation, prevention of code reflection, and code disassembly prevention.

11. The non-transitory computer-readable medium of claim 8, wherein the processor performs further steps comprising:
  determining a customer based on at least one of machine identification of the client device;
  sending a watermarked image to the client device or server cookies placed on the client device; and
  sending an out of band message to a determined customer.

12. The non-transitory computer-readable medium of claim 8, wherein the processor performs further step comprising:
  identifying an out of band channel for communication with a user in an out-of-band on-boarding process for the user.

13. The non-transitory computer-readable medium of claim 8, wherein the processor performs further steps comprising:
  determining a phone number-to-email identification (ID) mapping in an out-of-band on-boarding process for a user;
  asking the user to enter ID information corresponding to the mapping; and
  sending an out of band message to the user based on reversing the mapping.

14. The non-transitory computer-readable medium of claim 8, wherein the processor performs further steps comprising:
  collecting a user authorization from a user for making a payment;
  providing a user authorization token specific to a particular activity to the user;
  receiving a request to execute a pay call with the specific authorization token; and
  returning a payment status to the RIA application with a display on the screen of the client device.

15. The method of claim 1, further comprising:
  sending an out of band confirmation to a user of the client device.

16. The method of claim 7, wherein providing the user authorization token specific to the particular activity to the user further comprises:
  providing the user authorization token through the payment library to the RIA application for receipt by the user.

17. The non-transitory computer-readable medium of claim 8, wherein the processor performs further step comprising:
  sending an out of band confirmation to a user of the client device.

18. The non-transitory computer-readable medium of claim 14, wherein the processor performs further step comprising:
  providing a user authorization token specific to the particular activity to the user, wherein the user authorization token is provided specific to the particular activity through the payment library to the RIA application for receipt by the user.

* * * * *

UNITED STATES PATENT AND TRADEMARK OFFICE
CERTIFICATE OF CORRECTION

PATENT NO.         : 9,218,601 B2                                Page 1 of 1
APPLICATION NO.    : 13/293004
DATED              : December 22, 2015
INVENTOR(S)        : Prashant Jamkhedkar et al.

It is certified that error appears in the above-identified patent and that said Letters Patent is hereby corrected as shown below:

Specification

In column 3, line 16:

Change the word "interne" to --"internet"--

In column 7, line 19:

Change the word "RTA" to --"RIA"--

Signed and Sealed this
Tenth Day of May, 2016

Michelle K. Lee
*Director of the United States Patent and Trademark Office*